March 14, 1961 C. H. DOERSAM, JR 2,975,403

DATA TRANSMISSION SYSTEM

Filed July 13, 1956 7 Sheets-Sheet 1

INVENTOR.
CHARLES H. DOERSAM, JR.
BY W.R. Maltby
Louis B. Applebaum
ATTORNEYS

INVENTOR.
CHARLES H. DOERSAM, JR.
BY W R Mattox
Louis B. Applebaum
ATTORNEYS

INVENTOR.
CHARLES H. DOERSAM, JR.
BY W. R. Malto
Louis B. Applebaum
ATTORNEYS

March 14, 1961 C. H. DOERSAM, JR 2,975,403
DATA TRANSMISSION SYSTEM
Filed July 13, 1956 7 Sheets-Sheet 4

| | | |
|---|---|---|
| 1 | 0 0 0 0 | 0 0 0 0 |
| 2 | 0 0 0 1 | 0 0 0 1 |
| 3 | 0 0 1 0 | 0 0 1 1 |
| 4 | 0 0 1 1 | 0 0 1 0 |
| 5 | 0 1 0 0 | 0 1 1 0 |
| 6 | 0 1 0 1 | 0 1 1 1 |
| 7 | 0 1 1 0 | 0 1 0 1 |
| 8 | 0 1 1 1 | 0 1 0 0 |
| 9 | 1 0 0 0 | 1 1 0 0 |
| 10 | 1 0 0 1 | 1 1 0 1 |
| 11 | 1 0 1 0 | 1 1 1 1 |
| 12 | 1 0 1 1 | 1 1 1 0 |
| 13 | 1 1 0 0 | 1 0 1 0 |
| 14 | 1 1 0 1 | 1 0 1 1 |

INVENTOR.
CHARLES H. DOERSAM, JR
BY W R Maltz
Louis B. Applebaum
ATTORNEYS

March 14, 1961 C. H. DOERSAM, JR 2,975,403

DATA TRANSMISSION SYSTEM

Filed July 13, 1956 7 Sheets-Sheet 5

| | 8 | 4 | 2 | 1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

| | 8 | 4 | 2 | 1 |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 1 | 0 | 1 |
| 10 | 1 | 1 | 1 | 1 |
| 11 | 1 | 1 | 1 | 0 |
| 12 | 1 | 0 | 1 | 0 |
| 13 | 1 | 0 | 1 | 1 |
| 14 | 1 | 0 | 0 | 1 |
| 15 | 1 | 0 | 0 | 0 |

INVENTOR.
CHARLES H. DOERSAM, JR.
BY W. R. Mattty
Louis B. Applebaum
ATTORNEYS

INVENTOR.
CHARLES H. DOERSAM, JR.
BY W R Maltby
Louis B. Applebaum
ATTORNEYS

INVENTOR.
CHARLES H. DOERSAM, JR.
BY W. R. Maltby
Louis B. Applebaum
ATTORNEYS

United States Patent Office 2,975,403

Patented Mar. 14, 1961

2,975,403

DATA TRANSMISSION SYSTEM

Charles Henry Doersam, Jr., 24 Winthrop Road, Port Washington, N.Y.

Filed July 13, 1956, Ser. No. 597,835

10 Claims. (Cl. 340—149)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in data transmission systems, and more particularly pertains to improvements in systems for selecting, translating, indicating and recording intelligence.

Recent developments in high-speed digital computers, which perform their calculations on information presented in the form of digital or coded pulse groups, have accentuated the need for equipment adapted to translate physical quantities into coded form, and for equipment that will translate coded information into physical representation. Principal problems in achieving such ends have been the provision of means for displaying this information on an indicator, the recording of this indication, and the generating of coded information from either a shaft displacement or a rate of shaft rotation.

Disadvantages of prior proposed solutions of these problems are numerous, and comprise inadequacies in discrimination, range, flexibility, static and dynamic precision, and economy. These disadvantages are overcome by the subject device. In the system described below, information is converted to a form suitable for transmission by pickup elements, and can then be transmitted over wire or radio links. Upon translation, it is displayed on the indicator and can also be recorded. Thus, the functions of conventional selsyn systems are accomplished, with the difference that the information is handled in discrete sample or digital form. With the system disclosed, a full 360°, or any fraction or multiple thereof, can be measured and indicated; multiple indications of a plurality of variables can be combined on a single indicator, thereby permitting "in line" and other methods of rapid interpretation of indications especially adapted for use in aircraft applications of the system; precision of measurement, transmission and indication is virtually unlimited, being proscribed only by the number of digits that are utilized; dynamic precision is made a function of sampling rate only, no load being reflected into the quantity being measured and no inertia introducing an error factor into the indicator; indications can be multiplexed on a single element; the costs and complexities of construction are minimal as compared to prior instruments addressed to the same general functions; flexibility is assured, since any number of remote indicators can be connected with any number of remote pickups; and functions of shaft positions, such as sin $x$, cos $x$, log $x$, $f(x)$ etc., can be generated directly for input to a computer—the information generated is in a form suitable for acceptance by a computer.

The principal object of this invention is thus to provide an improved data transmission system.

Another object is to provide a system for selecting, translating and recording complex intelligence.

A further object is to provide a system for picking up information from one or more sources, transmitting such information to one or more remote locations, and for indicating and recording such information.

Still another object is to provide an indicator and a recorder adapted to indicate visually and record the value of one or more input quantities received in digital coded form, as a voltage level, as a frequency, or as a time interval, coupled by a translator that provides means for converting information from serial to parallel digital form, or from parallel digital to serial form.

Another object is to provide a data transmission system having the advantages enumerated above.

Other objects and many of the attendant advantages of this invention will be readily appreciated as the same becomes better understood by reference to the following detailed description when considered in connection with the accompanying drawings wherein—

Figure 8:
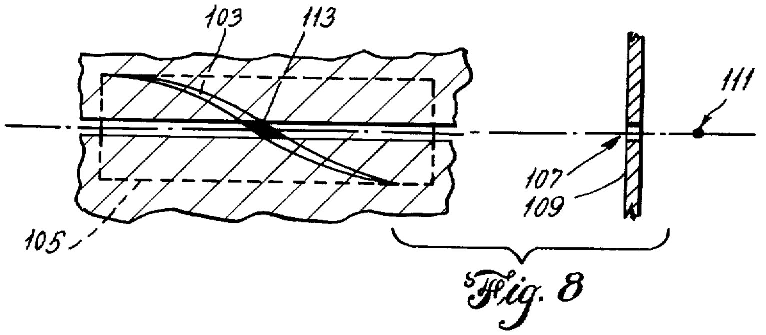
Figure 9:
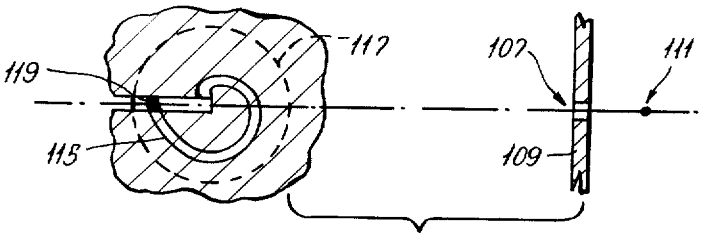
Figure 10:
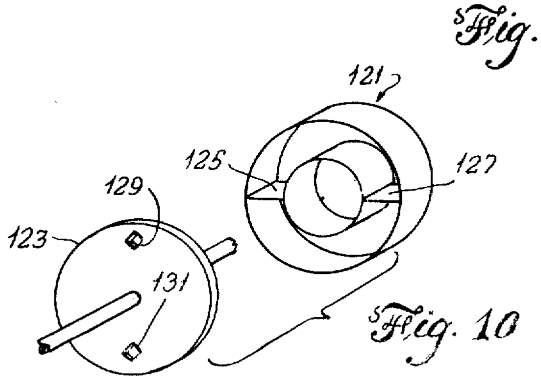
Figure 11:
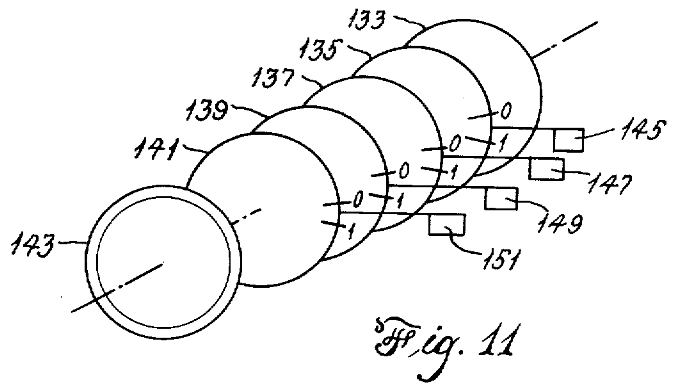
Figure 12:
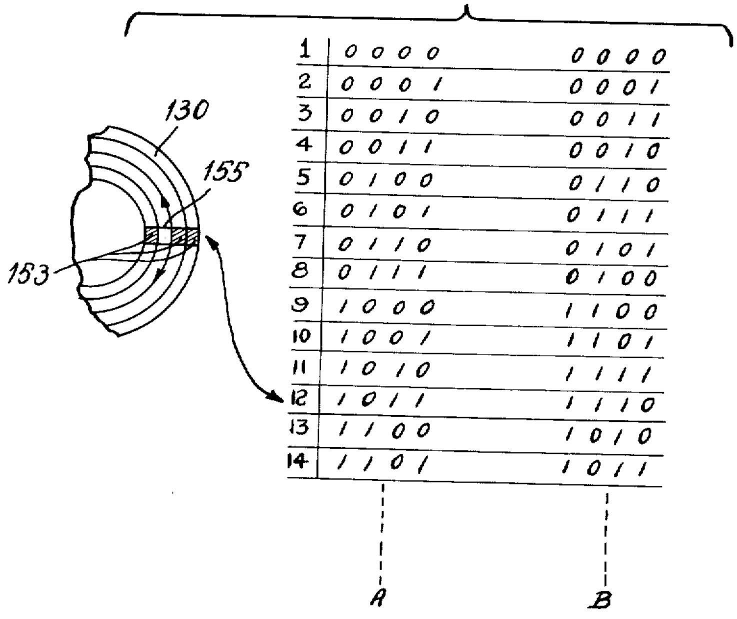
Figure 13:
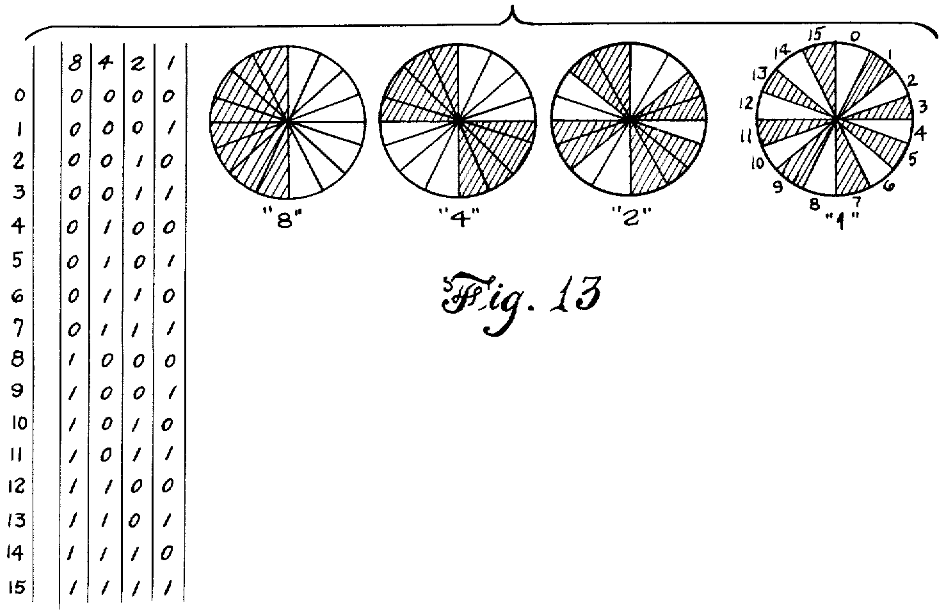
Figure 14:
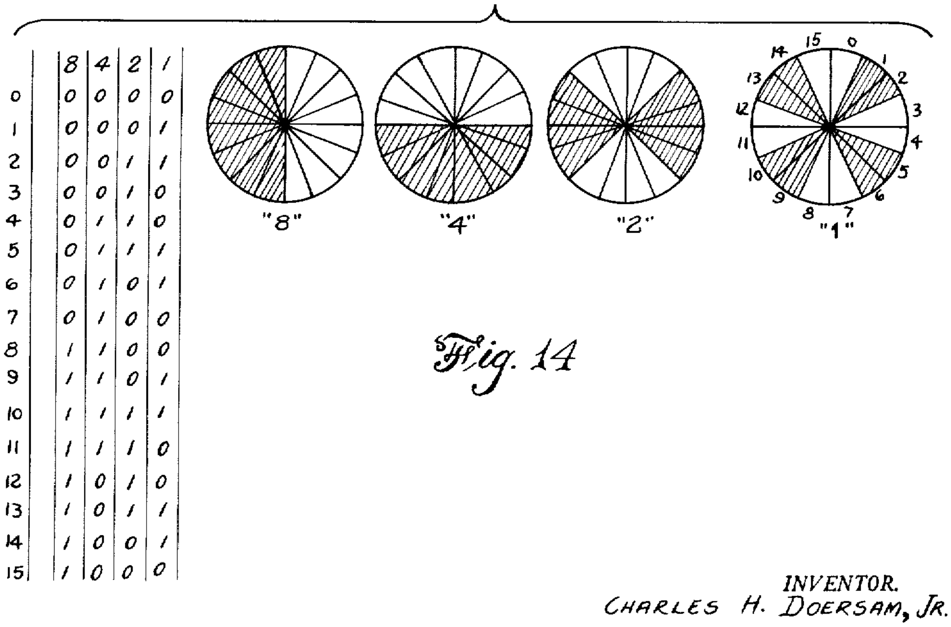
Figure 15:
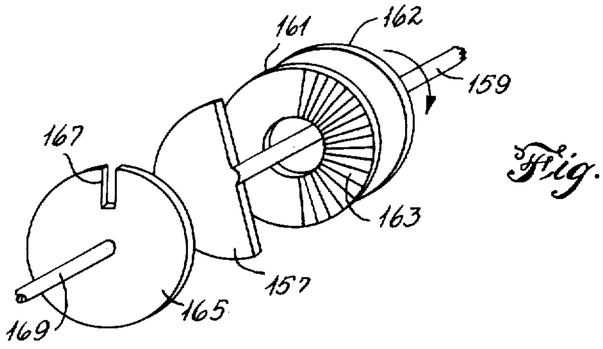
Figure 16:
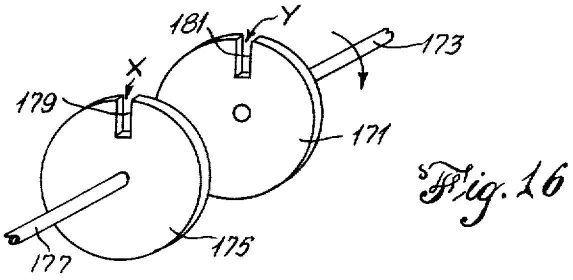

Figs. 8 and 9 each show schematically a means of generating the sweep for different displays;

Fig. 10 shows schematically an alternate means of sweep generation;

Fig. 11 shows schematically a modified form of indicator;

Figs. 12, 13 and 14 diagram disc coding systems;

Figs. 15 and 16 show schematically alternative coding means; and

Figs. 17, 18, 19 and 20 show alternative embodiments of translators adapted to be employed in the system.

Similar numerals refer to similar parts throughout the several views.

Figure 1:
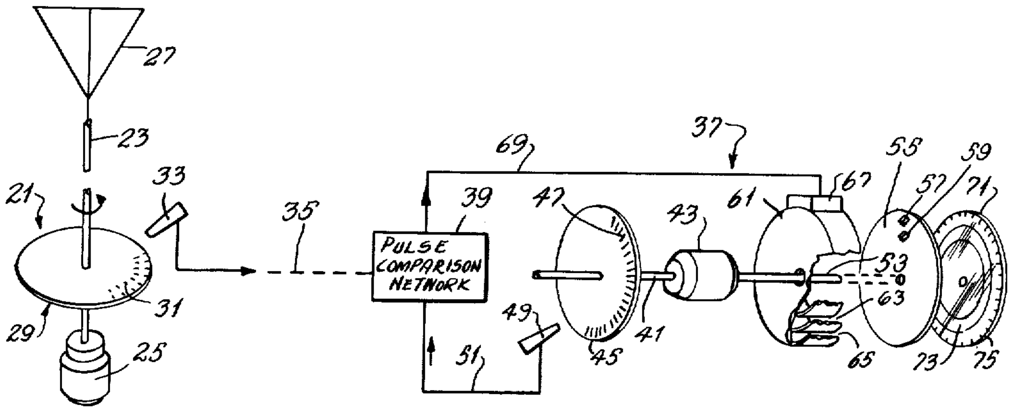
Fig. 1 is a schematic view of a data transmission system, showing a preferred embodiment of the invention.

In the embodiment of the invention shown in Fig. 1, the pickup 21 comprises a shaft 23 rotated by motor 25 through such gear mechanism (not shown) as may be desired. The shaft 23 can be the support mast of an antenna 27 or other element, the instant position and/or speed of rotation of which it is desired to determine.

Coding of the position of shaft 23 is accomplished by a disc 29 carried by said shaft, the disc 29 being coded radially by means 31 so that information can be derived from such disc by a mechanical, optical or magnetic sensing device 33. The output of the sensing device 33 is in the form of a pulse sequence having a characteristic that is a function of the information sensed.

The pulsed output is transmitted in any desired manner, as by lines 35 or radio, to an indicator station 37, where it is fed to a conventional pulse-comparison network 39. At the station 37, a shaft 41 rotated by motor 43 through such gear mechanism (not shown) as may be desired is provided. Coding of the position of shaft 41 is accomplished by a disc 45 carried by said shaft, the disc 45 being coded radially by means 47, so that information can be derived from such disc by a mechanical, optical or magnetic sensing device 49. The output of the sensing device 49 is in the form of a pulse sequence having a characteristic that is a function of the information sensed.

The pulsed output of the sensing device 49 is transmitted by transmission means 51 to the network 39. Disc 45 is provided with codes similar to the codes on disc 29, so that an output voltage is derived from the comparison network 39 when the inputs from sensing devices 33 and 49 are identical.

The motor 43 also drives shaft 53, which carries apertured disc 55. The disc 55 is provided with one or more apertures 57 and 59 that are shaped in the form of the desired indication. The indication is made preferably by means of a "dark" spot that scans the complete range of the scale of the variable condition under observation. The dark spot is turned on at the proper point in its scan to indicate the instant value of the condition, as hereinafter described.

Light assembly 61 comprises an inner annular light source 63 and a light source 65 concentric with source 63, the assembly 61 being mounted coaxial with shaft 53. The light sources 63 and 65 are energized through suitable switching means 67 by the application of a trigger pulse through conductor 69 from the comparison network 39. Where only a single indication is desired, one of the holes 57 and 59 and the corresponding light source 63 or 65 can be omitted.

Indicator dial 71 is coaxial with shaft 53 and is fixed. Dial 71 is provided with calibrated scales 73 and 75, which can be illuminated at the points during the revolution of disc 57, such points corresponding to the values of the condition under observation. Such scales can be provided with a phosphor coating or diffusing material to increase persistence between indications. Separate light sources can be used for each variable, time multiplexing of multiple variables can be employed, or a single light source can be adopted.

Salient features of preferred embodiments of the invention are shown with further particularity in the drawings, and are hereinafter described.

Figure 2:
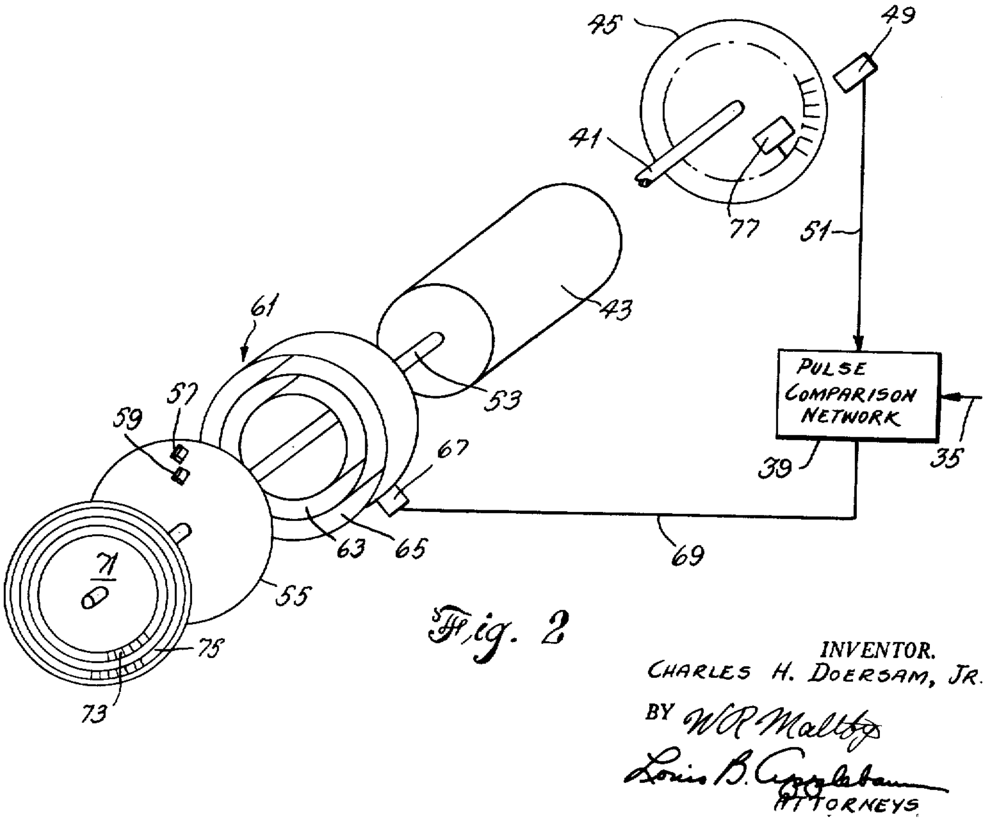
Fig. 2 is an expanded schematic view of an indicator-recorder and triggering means therefor.

In the mechanical circular scan embodiment of the indicator-recorder and triggering means shown in Fig. 2, it can be seen that light from source 63 or 65 is flashed, during the revolution of disc 55, at the point on disc 71 which corresponds to the value to be indicated. The input variable introduced through conductor 35 to network 39 in pulse code form is compared with the output of a sweep generator 77. The sweep generator senses each digit of each code in sequence to send the code in serial fashion to the comparison network 39, as hereinafter further described. The coding of disc 45 can be in a variety of different forms, as hereinafter illustrated and described with reference to Figs. 12, 13 and 14. The sensing means 49 can be mechanical contacts, the photo electric sensing of opaque and transparent regions on the disc, or the employment of magnetic heads sensing magnetically coded pulses on the disc. The trigger pulse is delivered to the light source 61 through conductor 69.

Figure 3:
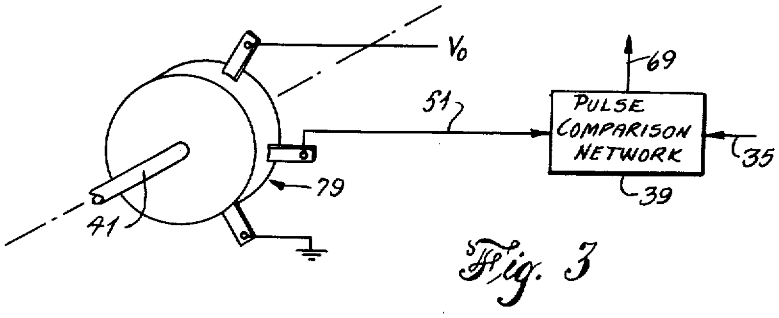
Figs. 3 to 7 are schematic views of alternate means to trigger the light source.
Figure 4:
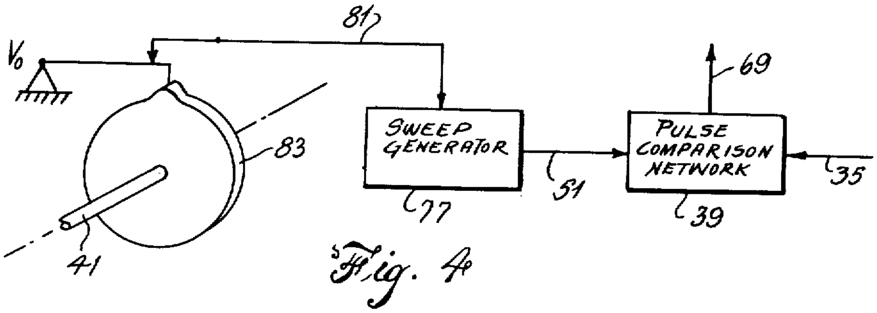
Figure 5:
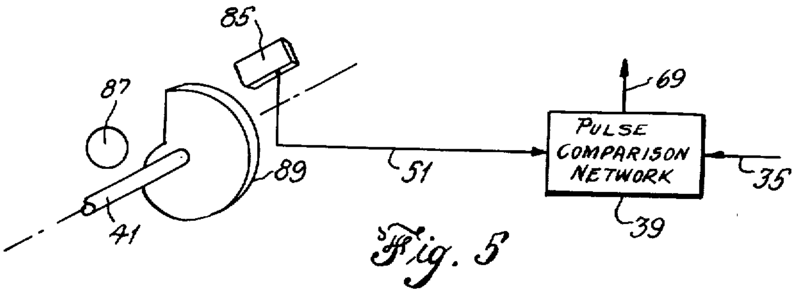

The means for generating the trigger pulse that flashes the light source can be that shown in Figs. 3, 4, 5, 6 or 7. In Figs. 3 to 7, an indicator input voltage is fed through conductor 51 to pulse comparison network 39, with the input voltage which represents the variable to be indicated being fed through conductor 35. When the two voltages are equal, a trigger pulse is generated and is transmitted to the light source through conductor 69. Thus, in Fig. 3, a continuous potentiometer 79 is attached to shaft 41 to generate a voltage that corresponds to the position of such shaft. In Fig. 4, a sweep generator 77 of sweep time related to the rotation rate of shaft 41 delivering its output through conductor 51 is triggered by a "zero" pulse from input 81, such zero pulse being generated at the zero position of a cam 83 carried on shaft 41. It is apparent that such cam 83 can be mechanical, as shown, or that magnetic or optical equivalents can be employed. In Fig. 5, the voltage at the conductor 51 is generated by means of a photo electric cell 85, which is actuated by a light source 87 that is adapted to be varied in intensity by cam 89 carried on shaft 41.

In the triggering means shown in Figs. 3 to 5, it is apparent that the indicator input voltage can be made to be any desired function of the angular displacement of shaft 41 by introducing non-linearities in the generating means. This will permit the introduction of various types of scales to the indicator.

Figure 6:
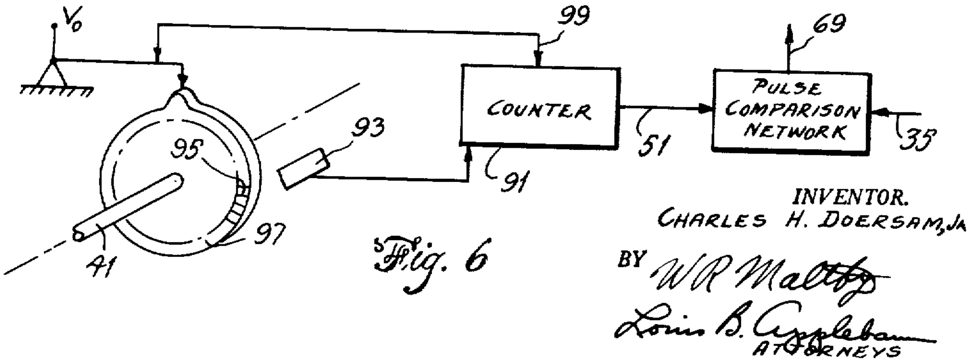

In Fig. 6, an indicator location comparison count is generated at conductor 51 by a counter 91, which receives impulses from a sensing system 93, said system 93 being adapted to sense markers 95 of disc 97, which is attached to shaft 41. A reset pulse is generated at the "zero" point on the scale of disc 97 and, through conductor 99 is adapted to reset the counter 91 to zero. Similarly, in Fig. 7, the operation is the same, except that the pulses for counter 91 are generated in a conventional time clock 101, it being assumed that shaft 41 is turned relative to the same standard time base.

Figure 7:
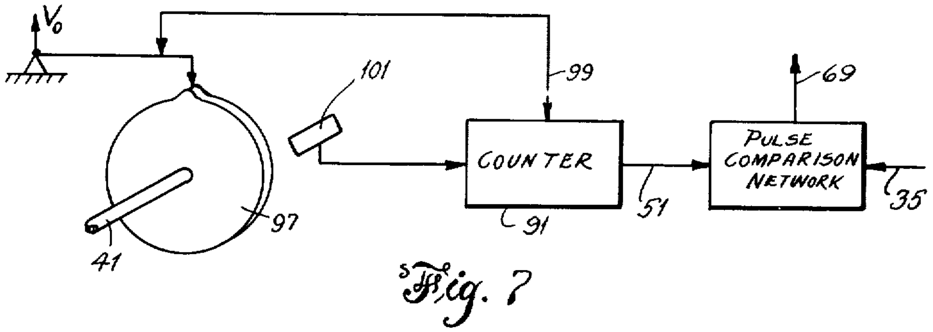

It is apparent that non-linearities can be introduced into the means of Figs. 6 and 7 by varying the spacing of the markers 95, by varying the pulses from clock 101.

As shown in Fig. 8, the display scale scan shown as a round scan in Figs. 1 and 2 can also be a linear scan. It can be generated by the intersection of a helix 103 cut in cylinder 105 and a slot 107 cut in plate 109, so that a light source 111 can be directed through the intersection of said slots to generate spot 113. Alternatively, as shown in Fig. 9, the scan motion is generated by the intersection of spiral 115 cut in disc 117 with the slot 107 cut in plate 109, the light source 111 being directed through said slots to generate spot 119.

The dynamic response can be increased by arranging the scale and holes so as to permit two indications per scan revolution, as shown in Fig. 10. Light assembly 121 and rotating disc 125 correspond to elements 61 and 55 of Fig. 2 respectively, operating similarly. Two light sources are defined by partitions 125 and 127, which bisect the cylinder of assembly 121, and diametrically opposed indicators 129 and 131 are cut through disc 123. The value of each indicator can thereby be presented twice during each revolution of the disc. Similarly, partitioning the assembly 121 into "$n$" light sources and providing "$n$" indicators permits "$n$" presentations per revolution, thereby increasing the dynamic response by a factor of "$n$." Further, additional flexibility can be afforded by allocating different variables to different segments of the scale. To record the indication against time, the recording material can be moved in a direction perpendicular to the direction of linear scan at a rate proportional to the desired time, marking the recording material either mechanically, photographically or magnetically.

Linear and circular scans can also be generated by cathode ray tubes. Frequencies can be indicated either by discrimination with reference to a voltage or they can be fed into a counter for a known time interval, such as one revolution of the indicator, and thereby be converted to a code. The time intervals that are equal to one revolution at full scale can be indicated directly.

The modified form of indicator shown in Fig. 11 comprises a light source 133, a plurality of concentric coded discs or actuators 135, 137, 139 and 141 and a scale 143, disposed on a common axis. The said coded discs each have two possible angular positions, corresponding to positions "1" and "0" as shown. The position for each coded disc is determined by the code transmitted to the four separate actuators 145, 147, 149 and 151 that are coupled to said discs. Thus, for any code combination there is only one unique spot that light from source 133 can strike scale 143, due to the discs being opaque except for the transparent regions at the positions "1" and "0."

Thus, the indicator of Fig. 11 accepts pulse coded information and displays it directly. The distance between adjacent indications is discrete, and depends on the precision with which the indicator is constructed and on the precision of the intelligence introduced, the four actuators shown being an illustration only. The code of four shown can be extended to "$m$" with double precision of each additional digit.

The scales of scale 143 can also be arranged linearly, circularly, or in other ways, with a corresponding modification of the motion of actuators 135, 137, 139 and 141.

Possible coding of the discs 135, 137, 139 and 141 are shown in Figs. 13 and 14. In Figs. 13 and 14, the arrangement of two possible types of coding on the coded discs is illustrated. The "1"s, "2"s, "4"s and "8"s discs correspond to the corresponding code columns of the four "coded" discs 135, 137, 139 and 141 in Fig. 11, the opaque sectors being cross-hatched. In each case, the "0" position (Fig. 11) is shown; in the "1" position (Fig. 11), the opaque and transparent areas would be interchanged. In practice, shutters (not shown) can be employed to permit light to pass through the areas indicated without rotating the discs through the entire sectors shown.

The indicator of Fig. 11 can be simplified and its range extended by using multiple light sources for the less precise code digits, as shown in Fig. 10. Suitable wiring for multiple light sources from a coded input is hereinafter described.

Means for generating coded information from D.C. voltage, pulse time modulation and frequency all well known, present information in a form adapted to be used with the indicators herein described. Means for generating information to actuate the indicators of this invention from rotating shafts that will indicate position as well as velocity of rotation are here described.

The coding of shaft position can be accomplished by use of a radially coded disc (Fig. 12) as in the coded trigger means of the indicator of Fig. 2. In Fig 12, disc 130 is provided with opaque and transparent areas 153 and 155 respectively. The columnar "1"s and "0"s indicate the two possible conditions of each element in each column. The disc illustrates the number "12" of the binary code A; modified binary B can be employed, in similar manner, so that adjacent numbers differ by one digit only, thereby affording automatic quantizing of information. The information can be read off in parallel form by a multiplicity of pickups, located anywhere around the disc, each looking at a different part on the radius, or it can be read off serially by scanning across a radius where the codes are located. Mechanical magnetic or optical means can be used. Two other methods of coding are shown in Figs. 15 and 16.

In the pulse count or time pickup of Fig. 15, semicircular opaque disc 157 is attached to the shaft 159, the position of which is to be measured. Disc 161 is fixed on the axis of shaft 159. One-half of disc 161 is opaque, while the other half is graduated with indications 163. Opaque scanning disc 165 has a slot 167, and is turned by shaft 169 so that slot 167 scans discs 163 and 157. A pulse count equivalent to the position of shaft 159 can be produced optically by counting the pulses transmitted from the light source 162 through the three discs, thus giving positional codes for shaft 159 from zero to 180 degrees. For 360 degrees coding, 360° of graduations 163 are required on disc 161. Two separate light pulse pickups are then required, each operating only over 180°. A conventional means for sensing which circuit operates first after the beginning of the scan will cause the counter to count the pulses from that source. If it is the 180° to 360° sector, 180° is added. The second pulse train is ignored.

In the time interval or position pickup of Fig. 16, disc 171 is attached to shaft 173, the position of which it is desired to measure. Disc 175 is attached to shaft 177 and scans disc 171. Slots 179 and 181 in discs 175 and 171 respectively permit light to pass from the shaft 177 end through the discs only when such slots are aligned. Thus the time between reference point X in the scan of disc 175 and the time of receipt of the intelligence pulse when the slots are aligned is proportional to the value being measured. This can be utilized by generating a count proportional to such time. It can be used in a system in whch the scan of disc 175 is synchronized with the remote scan of an indicator of the type hereinbefore described and the intelligence pulse from the pickup used to trigger the indicator.

A number of alternative coding means can be employed. Non-linearities can be introduced into the measurement by proper selection of the graduation spacing. Sine or cosine measurement, and similar functions, can be employed directly. Other pickup means, such as potentiometers, similar to the triggering means described can be employed.

Figure 17:
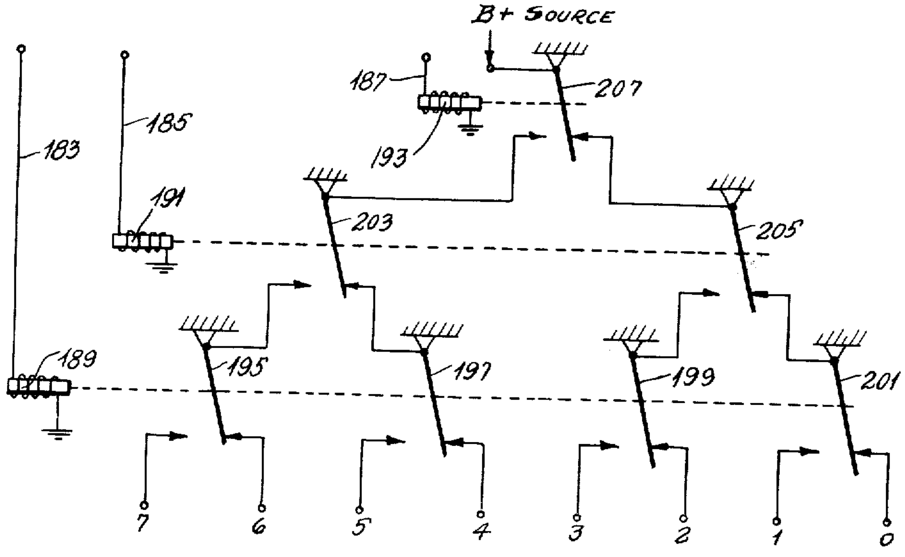

The translating matrix of "distributor" of Fig. 17 provides a means of distributing pulses to any one of eight possible outputs (marked 0 to 7) by means of codes applied across inputs 183, 185 and 187. With this circuit, wherein such inputs actuate relays 189, 191 and 193 respectively, contact arms 195, 197, 199 and 201 are ganged for response to energization of relay 189, contact arms 203 and 205 are ganged for response to energization of relay 191, and contact arm 207 is responsive energization of relay 187, a unique selection of one of the eight terminals can be made corresponding to the input code, and in accordance with the code set up on such input leads.

Figure 18:
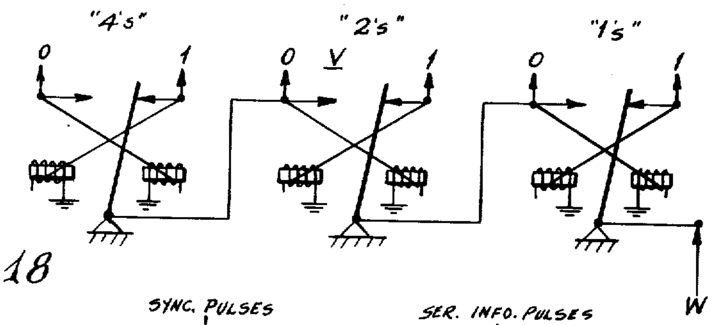

Fig. 18 shows a three stage binary counter, the input pulses being applied to the trigger terminal of the first stage at point W, and the code which appears at V being the binary representation of the count. Thus serial coded information is converted to parallel coded information.

Figure 19:
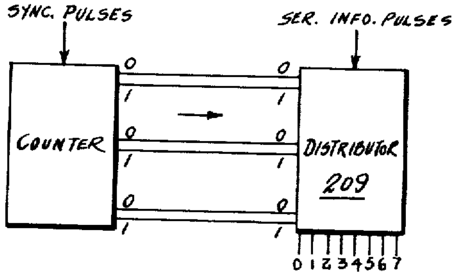

Serial to parallel code conversion can be accomplished as shown in Fig. 19. Serial information pulses are fed into a distributor 209, such as the matrix of Fig. 17. The counter of Fig. 18 is coupled to the distributor as indicated, and synchronizing pulses are fed into such counter. The counter is driven by the synchronizing pulses, which come between information pulse periods. Such serial information pulses thus are introduced to the input of the distributor, which sends them to the output terminals 0 to 7 in accordance with the setting of the counter with which it is synchronized, thereby forming a parallel code. Words shorter or longer than eight digits can be handled similarly.

Figure 20:
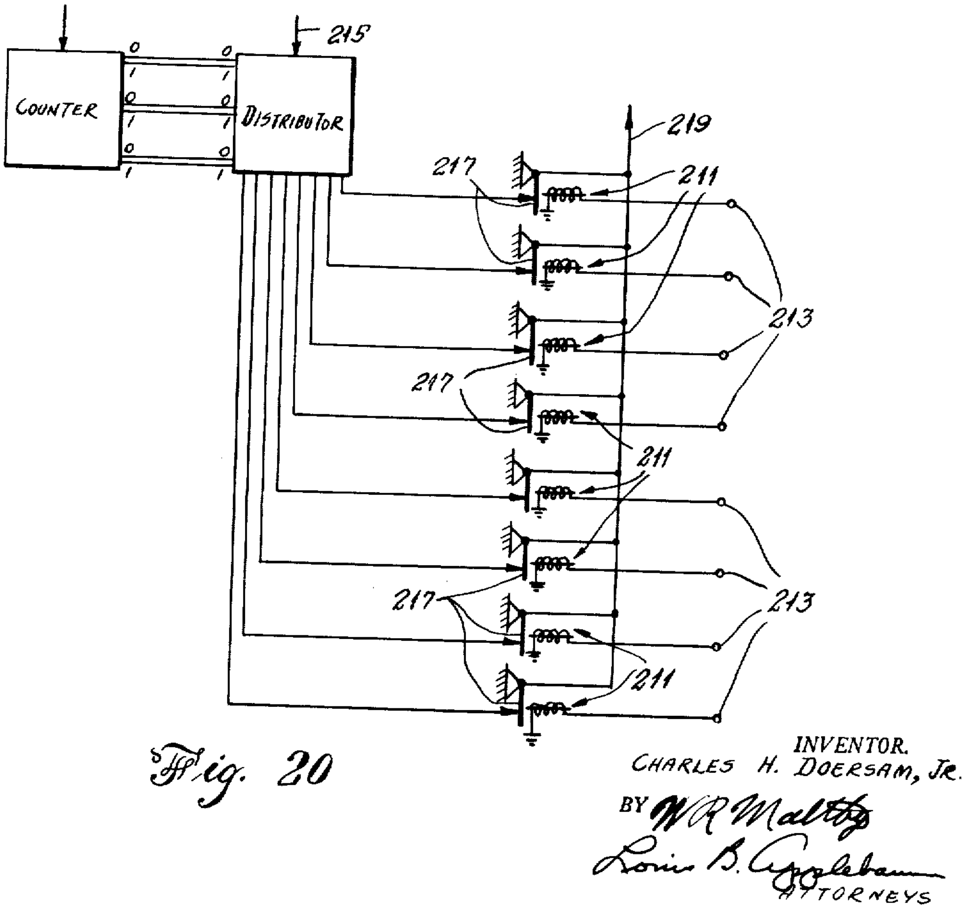

For the inverse operation, Fig. 20 shows a means of parallel to serial conversion. The parallel information pulses are applied across relay bank 211 on the terminals 213. Serial sampling pulses originating at 215, are then distributed in sequence to the bank of contacts 217 by means of the action of the counter and the distributor, are previously described. The code is generated by means of such contacts 217, which are connected to the serial output 219.

Obviously many modifications and variations of the present invention are possible in the light of the above teachings. It is therefore to be understood that within the scope of the appended claims the invention may be practiced otherwise than as specifically described.

What is claimed is:

1. A data transmission system for remote indication of the angular position of a motor-driven antenna shaft comprising a calibrated first disc carried by said shaft, means to sense the angular position of such shaft as a train of first pulses having a characteristic corresponding to such angular position, transmission means for transmitting said first pulses from said sensing means to another location, and a remote station having a pulse comparison network connected to said transmission means, and translation means comprising a motor-driven shaft, a calibrated second disc carried by said shaft, means to sense the angular position of said shaft as a train of reference second pulses having a characteristic equivalent to that of said train of first pulses, means feeding said reference second pulses to said network, and indicating means actuated by the coincidence in said network of identical characteristics of said first and second pulses, said indicating means comprising a light source actuated by such coincidence, an opaque disc having a transparent opening, said disc being carried rotatably by said shaft, and a calibrated scale in the path of light from said source projected through said opening.

2. The combination of claim 1 wherein said indicating means comprises a plurality of concentric light sources actuated selectively by said network, and said disc includes a transparent opening in the path to said scale of each of said sources.

3. The combination of claim 1 wherein said reference second pulses are derived from a sweep generator.

4. The combination of claim 3 wherein said sweep generator comprises the continuously rotating wiper of a potentiometer.

5. The combination of claim 3 wherein said sweep generator comprises a cam.

6. The combination of claim 3 wherein said sweep generator comprises a light source, cam means to vary the intensity of said source, and a photoelectric cell actuated by said source.

7. A data transmission system comprising a shaft, means for generating a train of first pulses coded to provide an indication of the instantaneous angular position of said shaft, a remote station having pulse comparison means, means to transmit said first pulses to said comparison means, and translation means in said station comprising means for generating a train of reference second pulses similar to said train of first pulses, means feeding said reference second pulses to said comparison means, and indicating means actuated by the coincidence in said comparison means of identical coded components of said first and second pulse trains.

8. A data transmission system as set forth in claim 7, said indicating means comprising a light source, a plurality of coded discs and a calibrated scale having a common axis, each of said discs defining a plurality of light responsive means disposed in a spaced and coded relation, and means to actuate each of said discs to alternate angular positions.

9. A data transmission system as set forth in claim 7, wherein said means for generating a train of first pulses comprises a semi-circular opaque disc carried by said shaft, a fixed disc coaxial with said shaft, one half of the fixed disc being opaque and the other half being marked with graduated indications, a second shaft coaxial with said first shaft, and an opaque scanning disc rotated by said second shaft, the latter being provided with a slot adapted to scan said semi-circular disc and said half-graduated disc.

10. A data transmission system as set forth in claim 7, wherein said means for generating a train of first pulses comprises a first opaque disc having a slot and carried by said shaft, a second shaft coaxial with said first shaft, and a second opaque disc having a slot adapted to coincide with the slot of said first disc.

References Cited in the file of this patent

UNITED STATES PATENTS

| | | |
|---|---|---|
| 1,915,993 | Handel | June 27, 1933 |
| 2,131,911 | Ayres | Oct. 4, 1938 |
| 2,203,995 | Main | June 11, 1940 |
| 2,410,669 | Lynn | Nov. 5, 1946 |
| 2,425,329 | Joy | Aug. 12, 1947 |
| 2,533,242 | Gridley | Dec. 12, 1950 |
| 2,666,911 | Reynolds | Jan. 19, 1954 |
| 2,680,241 | Gridley | June 1, 1954 |
| 2,748,341 | Federn | May 29, 1956 |
| 2,776,418 | Townsend | Jan. 1, 1957 |
| 2,776,421 | Nessmith | Jan. 1, 1957 |
| 2,784,397 | Branson | Mar. 5, 1957 |
| 2,785,388 | McWhirter | Mar. 12, 1957 |